(12) United States Patent
Marathe et al.

(10) Patent No.: US 12,140,701 B2
(45) Date of Patent: Nov. 12, 2024

(54) SENSOR HEAD ASSEMBLY HAVING OPPOSING SENSOR CONFIGURATION WITH MOUNT

(71) Applicant: LG INNOTEK CO., LTD., Seoul (KR)

(72) Inventors: Rituja Marathe, San Francisco, CA (US); Christopher John Trowbridge, Dexter, MI (US)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/322,305

(22) Filed: May 23, 2023

(65) Prior Publication Data

US 2024/0069166 A1 Feb. 29, 2024

Related U.S. Application Data

(60) Provisional application No. 63/402,362, filed on Aug. 30, 2022, provisional application No. 63/401,727, filed on Aug. 29, 2022, provisional application No. 63/400,209, filed on Aug. 23, 2022.

(51) Int. Cl.
G01S 7/481 (2006.01)

(52) U.S. Cl.
CPC ................. *G01S 7/4813* (2013.01)

(58) Field of Classification Search
CPC ....... G01S 7/1413; G01S 7/1417; G01S 7/931
See application file for complete search history.

(56) References Cited

U.S. PATENT DOCUMENTS

| | | | |
|---|---|---|---|
| 2011/0216304 A1* | 9/2011 | Hall | G01S 17/89 356/4.01 |
| 2019/0191083 A1* | 6/2019 | Gorloff | H04N 23/90 |
| 2021/0215803 A1* | 7/2021 | Zhou | G01S 7/4861 |
| 2022/0357426 A1* | 11/2022 | Krishnan | G01S 7/931 |

* cited by examiner

*Primary Examiner* — Thanh Luu

(74) *Attorney, Agent, or Firm* — Birch, Stewart, Kolasch & Birch, LLP

(57) ABSTRACT

An optical sensor assembly including a housing structure, a first optical sensor secured to the housing structure and arranged to sense in a first direction and a second optical sensor secured to the housing structure and arranged to sense in a second direction opposite to the first direction.

19 Claims, 14 Drawing Sheets 16  17  • Inter Rim Parts to block bypass flow

Sensor head Enclosure
• IP67 sealed when attached to Rotating Platform

Channel

Channel

215

220

SENSOR HEAD ASSEMBLY HAVING OPPOSING SENSOR CONFIGURATION WITH MOUNT

CROSS REFERENCE TO RELATED APPLICATIONS

This application claims priority under 35 U.S.C. § 119(e) to U.S. Provisional Application No. 63/400,209, filed on Aug. 23, 2022, to U.S. Provisional Application No. 63/401,727, filed on Aug. 29, 2022, and to U.S. Provisional Application No. 63/402,362, filed on Aug. 30, 2022, all of which are hereby expressly incorporated by reference into the present application.

BACKGROUND OF THE DISCLOSURE

1. Field of the Disclosure

The present disclosure is directed to a sensor head assembly having a compact rotating assembly that avoids optical interferences, a sensor mounting apparatus having a rigid skeletal structure, and an optical sensor enclosure with improved ingress and egress of airflow for cooling and cleaning.

2. Description of the Related Art

Autonomous vehicles AVs) use a plurality of sensors for situational awareness. The sensors, which can be part of a self-driving system SDS) in the AV, include one or more of a camera, lidar (Light Detection and Ranging) device, inertial measurement unit (IMU), etc. The sensors such as cameras and lidar are used to capture and analyze scenes around the AV to detect objects including static objects such as fixed construction(s), and dynamic objects such as pedestrians and vehicles. Data from such sensors can also be used to detect conditions, such as road markings, lane curvature, traffic lights and signs, etc. In addition, a scene representation such as 3D point cloud obtained from the AVs lidar can be combined with images from cameras to obtain further insight about the scene or situation around the AV.

In addition, a lidar sensor operating on an AV includes a transceiver apparatus including a transmitter and receiver assembly. the transmitter transmits a light signal and the receiver receives and processes the received light signal. To provide high fidelity object detection and tracking, an optical sensor such as lidar, includes rigidly fixed optical components and sufficient spacing for one or more transceiver assemblies, processing and driver circuitry, cooling elements, cleaning elements, wiring, and associated motor assemblies. The lidar can also have the transceiver components rigidly fixed with respect to each other to withstand automotive grade vibrations, high speed rotations for mechanical lidar assemblies, and address balance and weight considerations. Additionally, the lidar needs sufficient accommodation packaging and needs to consider aesthetic considerations.

SUMMARY OF THE DISCLOSURE

Accordingly, an object of the present invention is to address the above-noted and other problems.

Another object of the present disclosure is to provide improvements in inertia mass effects of the optical sensor during rotation so the center of gravity of the respective optical devices are positioned to be substantially diametrically opposite one another relative to a center of rotation.

Still another object of the present disclosure is to provide a sensor mounting apparatus having a rigid structure, which enables the modular attachment of components, such as cooling elements, window elements, cleaning elements, and the like, accommodate space considerations, and provide sufficient sealing from external and weather elements.

To achieve these and other advantages and in accordance with the purpose of the present invention, as embodied and broadly described herein, the present invention provides in one aspect an optical apparatus including a pair of optical sensors oriented in opposing directions to provide a compact rotating assembly. The minimization of size improves weight, aerodynamic drag, and/or wind noise during high-speed movement.

In another aspect, the present disclosure provides a plurality of optical sensors nested with respect to each other so the field of view of each of the respective optical sensors is substantially diametrically opposed to one another (e.g., opposite to one another). Each sensor can differ in performance specifications and/or operational purpose. For example, a plurality of sensors having differing range capabilities can be provided. Positioning at least a pair of optical sensors in this fashion improves packaging efficiency for the sensor head assembly. In another example, more than two sensors can be positioned with respect to one another, with each of the multiple sensors having a substantially divergent field of view with respect to the other optical sensors.

Further, each sensor can be juxtaposed to a sidewall of an outer housing of the lidar sensor assembly. In addition, thermal heat sinks are provided within the outer housing. The thermal heat sinks absorb and dissipate heat generated by the optical sensors during operation. In one example, a thermal heat sink apparatus is disposed about a rear portion of each of the respective optical sensors, opposite a front lens portion. Each heat sink can have a shape corresponding to a cylindrical shape of the outer housing, can be disposed adjacent to a first window and concurrently remain in contact with the rear portion of the opposing optical sensor directed away from the first window.

Advantages of the present disclosure include the avoidance of optical interference, or crosstalk, between the two or more optical sensors. When the optical sensors are disposed with an overlapping field of view, light return resulting from an emission of a first optical sensor can be received by the second optical device and cause errors in range detection, etc. Conversely, arranging the optical devices in opposing direction avoids optical interference altogether between the two sensors (e.g., the two separate transceivers).

The present disclosure also includes improvements in inertia mass effects during rotation. That is, the center of gravity of the respective optical devices can be positioned to be substantially diametrically opposite one another relative to a center of rotation.

In still another aspect, the present disclosure provides a mounting apparatus for an optical sensor includes a skeletal assembly comprising six facia. The individual fascia include structural features to receive one or more components of the sensor assembly. For example, one or more of the six facia are configured to receive modular cooling elements. Similarly, one or more of the six facia are configured to receive a modular detachable optical window. One or more of the six facia can also be configured to rigidly secure one or more transceiver assemblies of the optical sensor. Therefore, the mounting apparatus is flexibly configured to accept a plurality of different component types and provide a rigid mounting structure.

Thus, the present disclosure provides a sensor mounting apparatus that provides rigid structure, enables the modular attachment of components, such as cooling elements, window elements, cleaning elements, and the like, accommodate space considerations, and provide sufficient sealing from external and weather elements.

In still another aspect, the present disclosure provides a lidar sensor system including a housing for containing electronics, optical elements, cooling elements and architectural or structural elements designed to hold such components into place. An enclosure is provided to provide functional and aesthetic solutions to the lidar sensor system and can be designed to maximize ingress and egress of airflow for cooling and cleaning purposes. The enclosure can also provide an aerodynamic housing for the lidar sensor system.

Further scope of applicability of the disclosure will become apparent from the detailed description given hereinafter. However, it should be understood that the detailed description and specific examples, while indicating embodiments of the disclosure, are given by way of illustration only, since various changes and modifications within the scope of the disclosure will become apparent to those skilled in the art from this detailed description.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE DISCLOSURE

Figure 1:
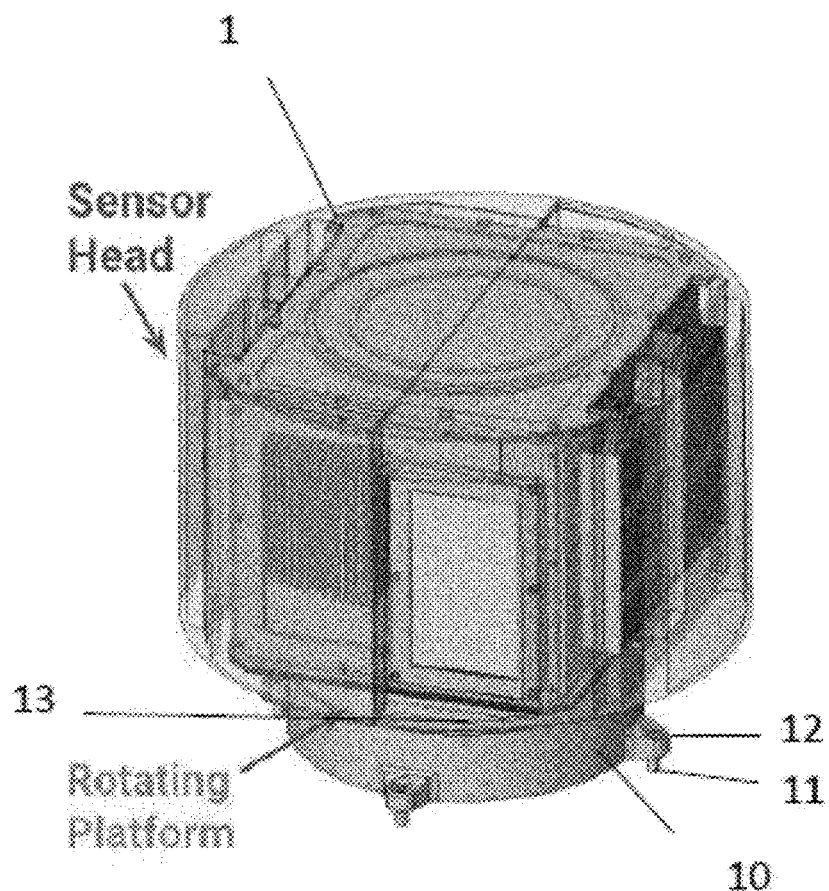
FIG. 1 is a side perspective view of a sensor head mounted to a rotating platform according to an embodiment of the present disclosure.

The present disclosure will now be described with reference to the accompanying drawings, wherein the same reference numerals have been used to identify the same or similar elements throughout the several views.

FIG. 1 is a side perspective view of a sensor head 1 mounted to a rotating platform 10. As shown, the sensor head 1 includes two opposing sensors 5, 6 (FIG. 2), having a different field of view, to avoid risk of a light return resulting from an emission of a first optical sensor 5 being received by the second optical device 6 and causing errors in range detection, etc. The sensor head 1 includes a window 3 (e.g., channel) for each sensor 5, 6 (e.g., a single window for each sensor), and the window 3 can be for Tx (transmitter) optics and Rx (receiver) optics. In more detail, the Tx optics refer to an output power of a transceiver apparatus (e.g., sensor device), which can be a lidar transceiver apparatus. The Rx optics refer to a receiver assembly of the lidar assembly, and that receives the transmitted signal as well as stray light and other light signals. Further, the Rx optics can include a lens assembly, as shown in FIG. 2.

FIG. 1 also illustrates a rotating platform 10 including flanges 12 that can be attached to a fixed surface, such as a table via fasteners 12. The fasteners 12 can be screws, bolts, nails or the like. The rotating platform 10 can be attached to the bottom surface of the sensor head 1 by fasteners and the like, and can be removably attached to the sensor head 1. Further, the rotating platform 10 includes a top member 13 having bearings, which allow the rotating platform 10 to be rotatable with respect to the sensor head 1. Therefore, the sensor head 1 can rotate about the rotating platform 10 via the bearings.

In addition, the sensor head 1 can further include a heat sink 4 (e.g., thermal sink) on opposing sides of the sensor head 1. In particular, the heat sinks 4 cool the optical sensors 5, 6 to ensure they operate within predefined temperature conditions. Each heat sink 4 can be disposed at a rear portion of each of the optical sensor 5, 6. Each heat sink 4 can also have a curvature to match a curvature of an outer housing 2 of the sensor head 1, and be disposed adjacent to a corresponding window 3 and concurrently remain in contact with a rear portion of the corresponding optical sensor 5, 6. Further, each heat sink 4 can be in contact with, or be spaced from, the outer housing 2 of the sensor head 1.

Figure 2:
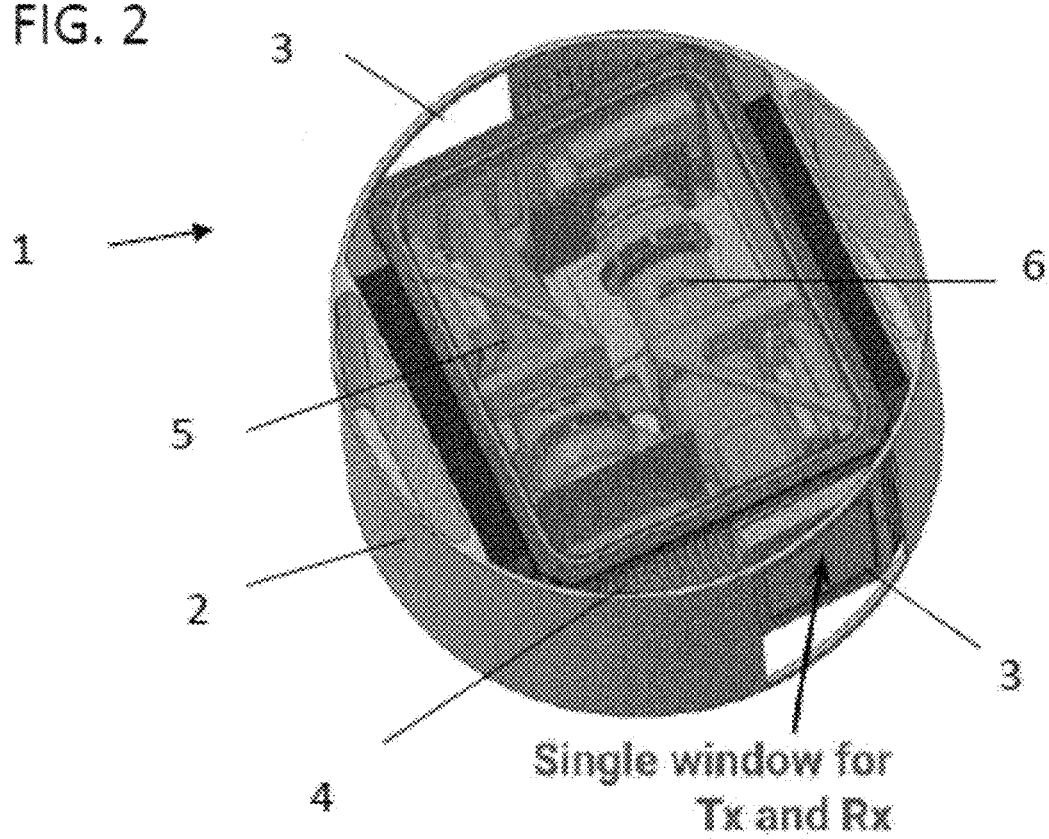
FIG. 2 is a top perspective view of the sensor head of FIG. 1, showing a pair of sensors disposed in opposing directions.

Next, FIG. 2 is a top perspective view of the sensor head of FIG. 1, showing a pair of sensors 5, 6 disposed in opposing directions. The optical sensors 5, 6 can be directed away from one another, such that they are oriented 180° from one another. This opposing orientation of the optical sensors 5, 6 limits potential optical interference, or crosstalk, between the optical sensors 5, 6. Each optical sensor 5, 6 can be a lidar device, such that the sensor head 1 of the present disclosure can accommodate two separate lidar devices. However, additional lidar devices can be present within the sensor head, with a corresponding number of windows. When more than two lidar devices are present, they can be oriented at different angles relative to a cross-sectional center of the sensor head 1.

According to an embodiment of the present disclosure, a plurality of optical sensors 5, 6 can be positioned with respect to each other so the field of view of each of the respective optical sensors 5, 6 is substantially diametrically opposed to one another. More specifically, each of the optical sensors 5, 6 can differ in performance specifications and/or operational purpose including having differing range capabilities. The optical sensors 5, 6 can be positioned as shown in the figures to improve packaging efficiency for the sensor head 1. In further examples, more than two sensors can be positioned within the sensor head 1 with respect to one another, where each of the multiple sensors has a substantially divergent field of view with respect to the other optical sensors. Each sensor also can include a transceiver including an optical transmitter and receiver.

Figure 3:
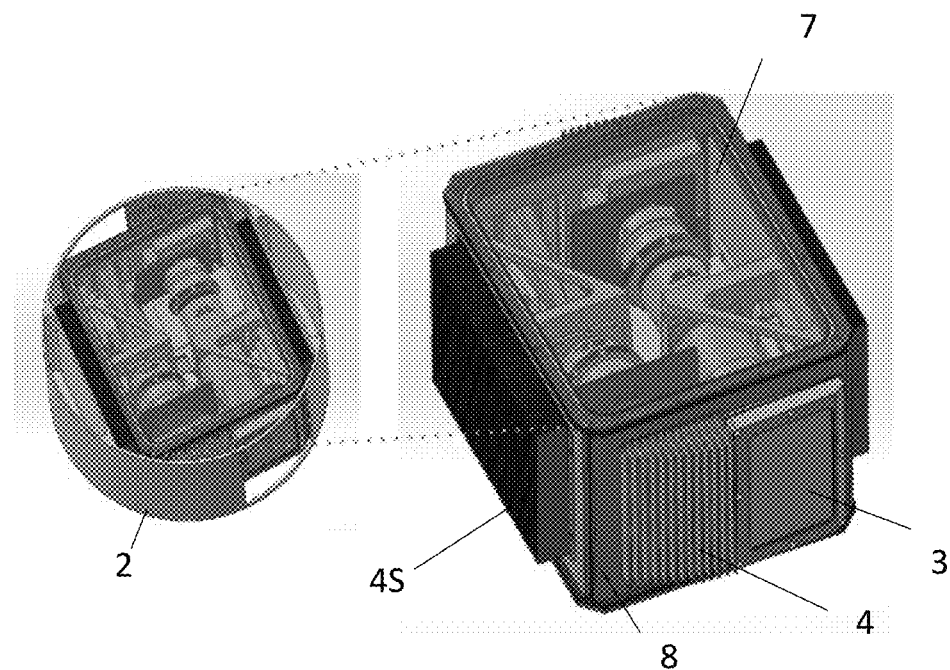
FIG. 3 is a top perspective view of the sensor head of FIG. 1, showing a sensor head 1 with and without an outer housing.

Next, FIG. 3 is a top perspective view of the sensor head of FIG. 1, showing a sensor head 1 with and without an outer housing 2. The heat sink 4 is shown having a curvature matching the curvature of the outer housing 2. The sensor head 1 can be provided with a lid 7, and the lid 7 can be provided with a seal facing a surface (e.g., top surface) of the sensor head 1, such as a rubber seal, to weatherproof the sensor head 1. Further, the lid 7 can be adhesively bonded to a surface of the sensor head 1. Also, the window 3 and the heat sink 4 can be attached to plate 8, such as by fasteners, and the heat sink 4 can also be detachable from the plate 8. Alternatively, the heat sink 4 and the plate 8 can be simultaneously formed together, such as by casting, extrusion, machining, or the like. The heat sinks 4 can also be provided at front and rear surfaces of the sensor head 1, and additional heat sinks 4S can be provided on the left and right surfaces of the sensor head 1, to provide additional heat dissipation. The additional heat sinks 4S can have a rectangular shape, and can accommodate a majority of a side of the sensor head 1 to maximize heat dissipation. Further, each additional heat sink 4S can be part of a corresponding one of the sensors 5, 6, such that the sensor 5, 6 and the corresponding heat sink 4S represent a single module, as shown in FIG. 4.

Figure 4:
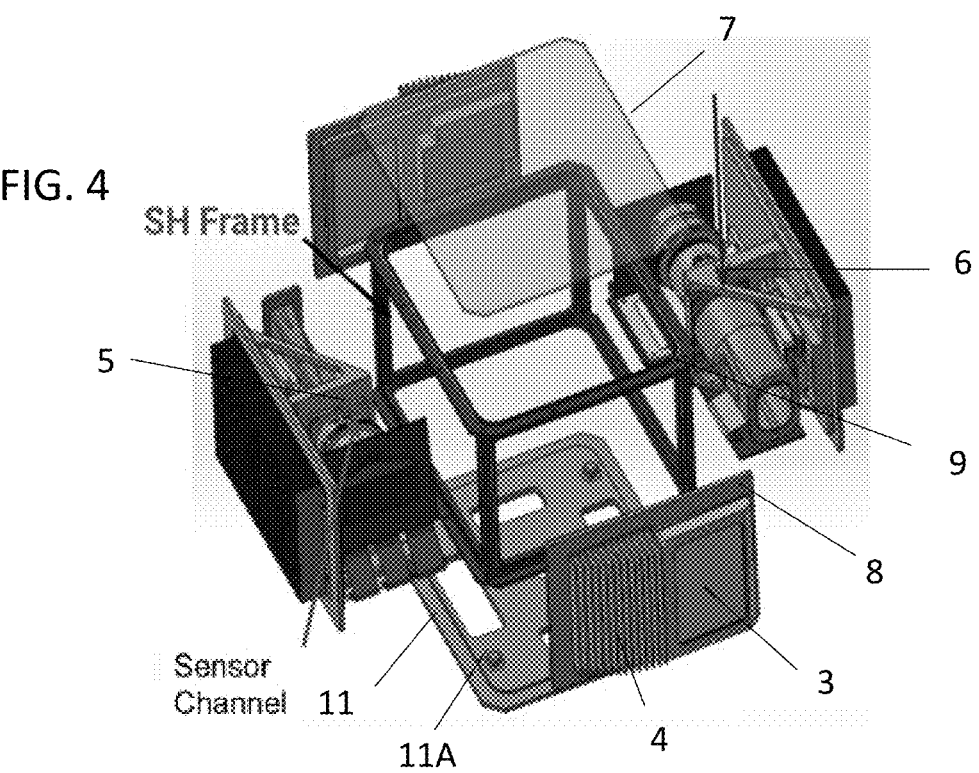
FIG. 4 is an exploded view of the sensor head of FIG. 1.

In more detail, FIG. 4 is an exploded view of the sensor head of FIG. 1, showing a frame 9 of the sensor head 1. Each of the sensors 5, 6, can be attached to the frame 9 by fasteners, for example. As shown in FIG. 4, the frame 9 can have a cuboid shape with hollow walls at each face for insertion and assembly of the sensors 5, 6 to the frame 9. The sensor head 1 can include a base plate 11, which includes protrusions 11A for locating the sensors 5, 6. That is, the sensors 5, 6 can include a groove that corresponds to one of the protrusions 11A.

Figure 5:
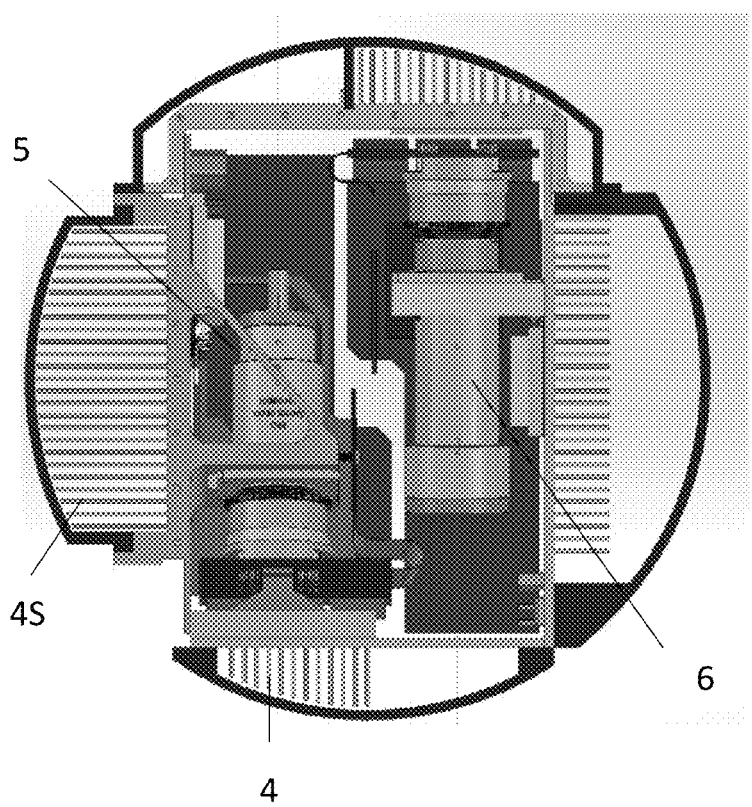
FIG. 5 is a top cross-sectional view of the sensor head of FIG. 1.
Figure 6:
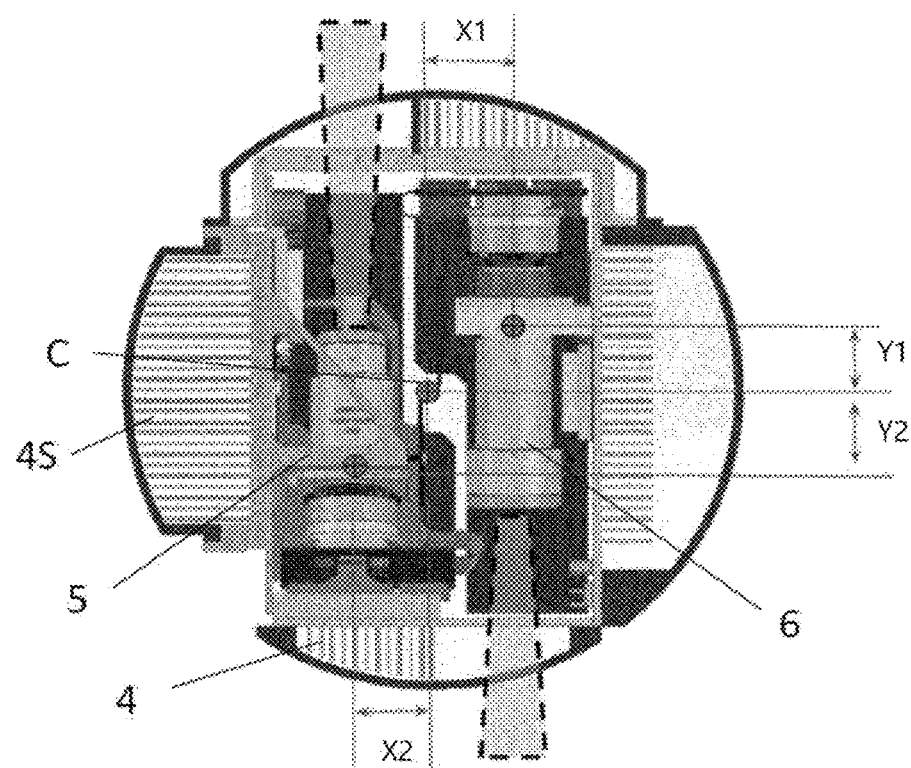
FIG. 6 is a top cross-sectional view of the sensor head of FIG. 1, showing a light projection of the opposing sensors.
Figure 7:
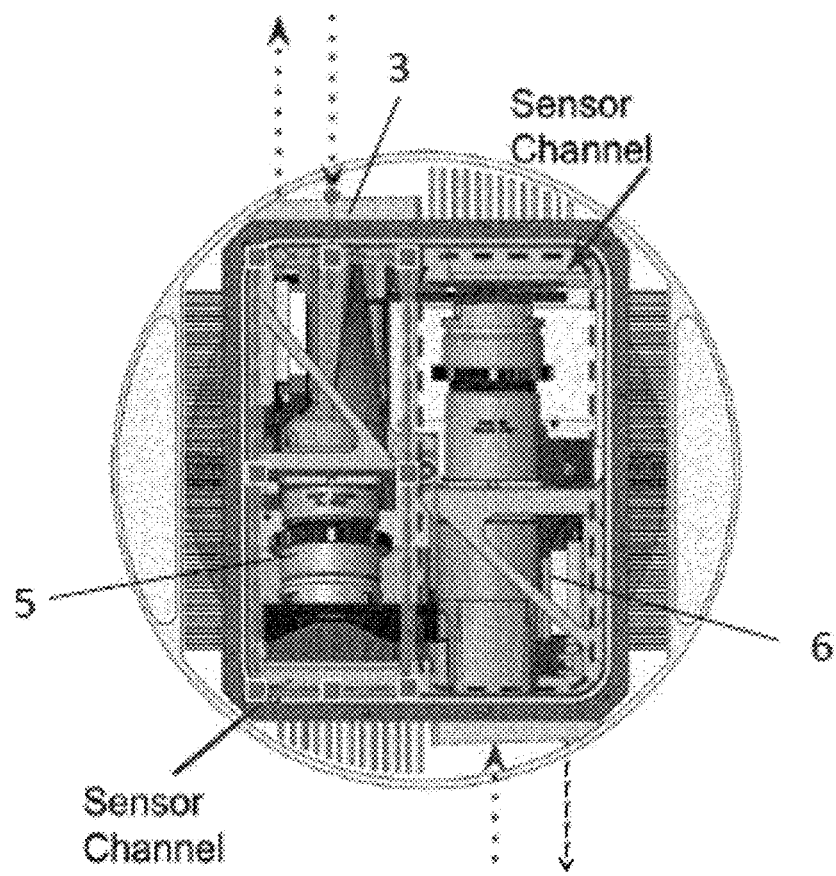
FIG. 7 is a top cross-sectional view of a sensor head having sensors with modified sensor channels according to an embodiment of the present disclosure.

Next, FIG. 5 is a top cross-sectional view of the sensor head of FIG. 1, FIG. 6 is a top cross-sectional view of the sensor head of FIG. 5, showing a light projection of the opposing sensors, and FIG. 7 is a top cross-sectional view of a sensor head having alternate sensors with modified sensor channels. As shown in FIGS. 5-7, the sensors 5, 6 are arranged to face opposite directions, which allows for a less clearance within the sensor head 1, thereby providing a more efficient packaging and minimizing the size of the sensor head 1.

FIG. 6 illustrates a cross-sectional center C of the sensor head 1. X1 represents a distance, in an X-direction, between a center of a second sensor 6 and the cross-sectional center C; X2 represents a distance, in an X-direction, between a center of a first sensor 5 and the cross-sectional center C; Y1 represents a distance, in a Y-direction, between a center of a second sensor 6 and the cross-sectional center C; and Y2 represents a distance, in a Y-direction, between a center of a first sensor 5 and the cross-sectional center C. FIG. 7 shows arrows representing the transmission of light and receiving light at each of the windows 3 of the optical sensors 5, 6.

Figure 8:
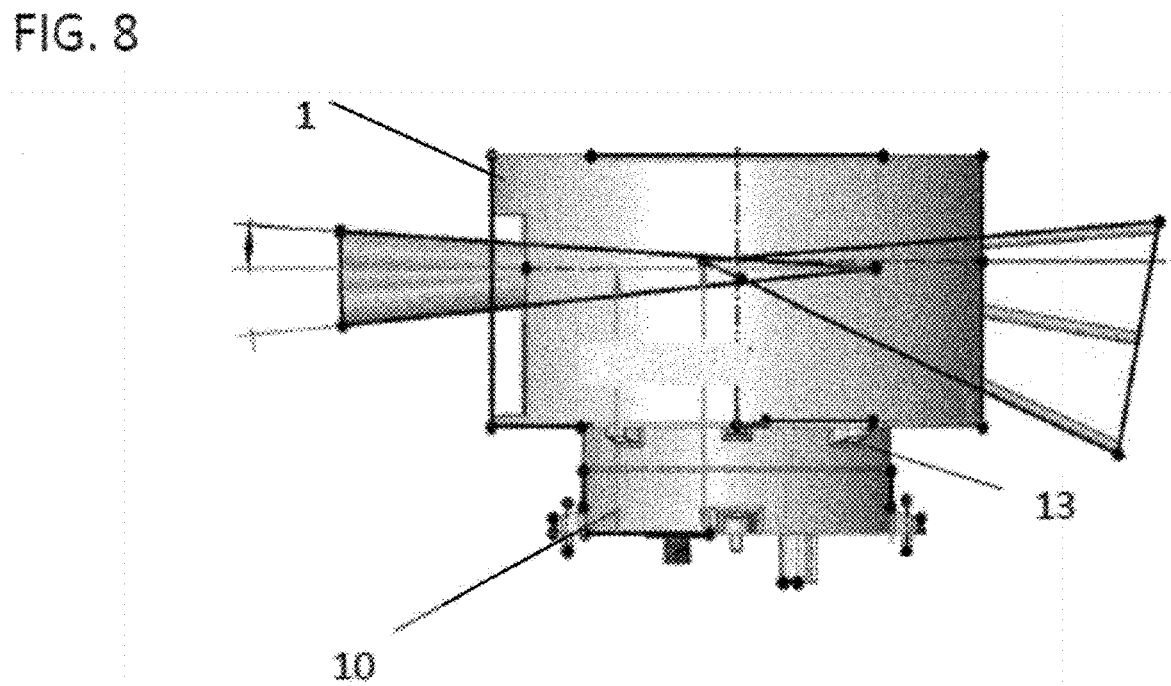
FIG. 8 is a side cross-sectional view of the sensor head of FIG. 1, including tiltable sensors.

Next, FIG. 8 is a side cross-sectional view of the sensor head illustrating the sensor head of FIG. 1 including tiltable sensors. The optical sensors 5, 6 can be tiltable in a vertical direction (e.g., Z-direction that is perpendicular to the X-direction and the Y-direction set forth above). Each optical sensor 5, 6 can have a varying degree of tilt, such that a first sensor 5 can tilt more or less than a second sensor 6, as shown in FIG. 8.

Figure 9:
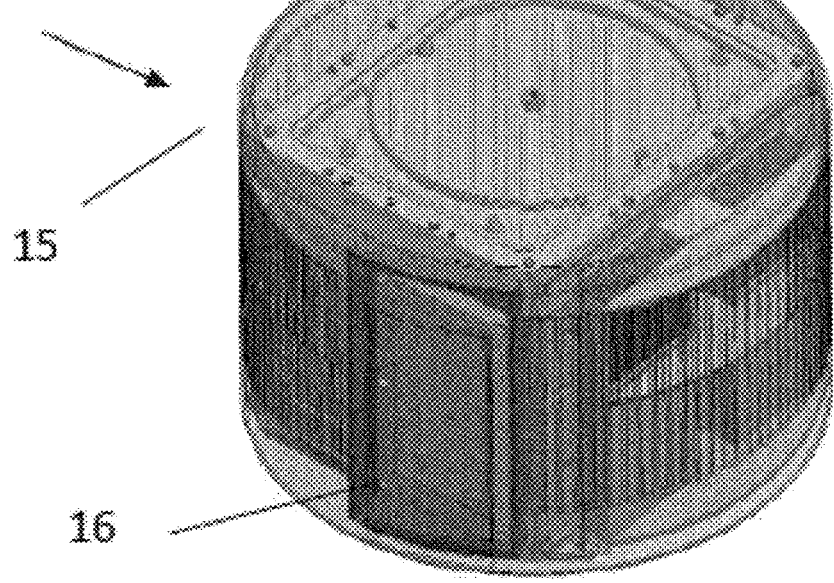
FIG. 9 is a top perspective view of the sensor head of FIG. 1, showing a rim outer cover.
Figure 10:
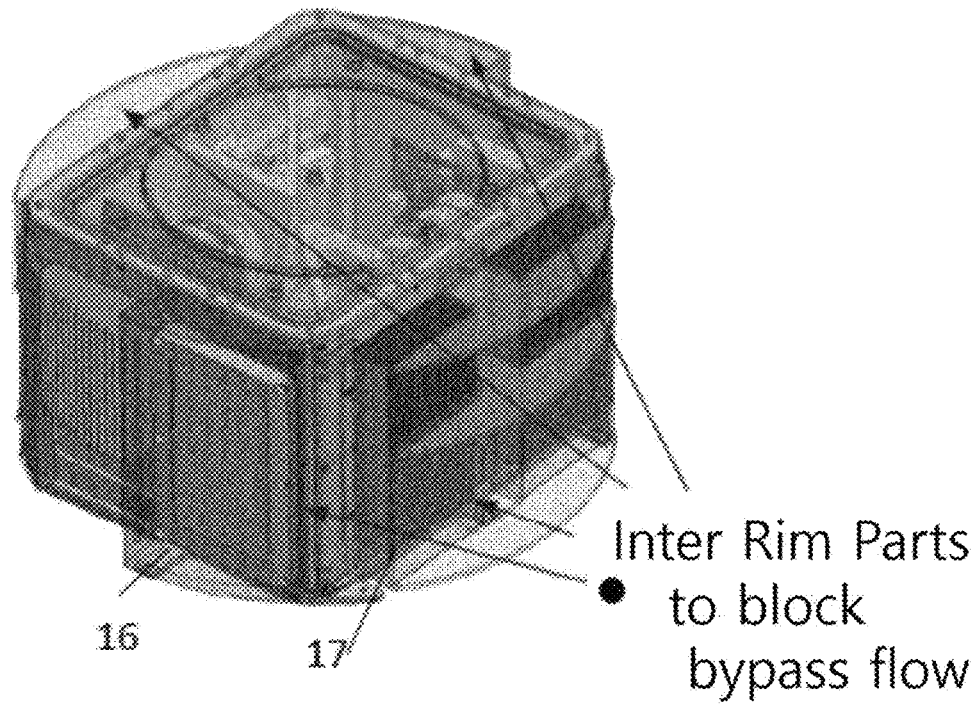
FIG. 10 is a top perspective view of the sensor head of FIG. 1, showing interior rim parts to block bypass air flow.

FIG. 9 is a top perspective view of the sensor head of FIG. 1, showing a rim outer cover 15 and FIG. 10 is a top perspective view of the sensor head of FIG. 1, showing interior rim parts to block bypass air flow. The rim outer cover 15 includes two cover windows 16 at a location corresponding to the windows 3 of the optical sensors 5, 6. The two cover windows 16 and two side covers 17 constitute interior rim parts that block bypass air flow.

Figure 11:
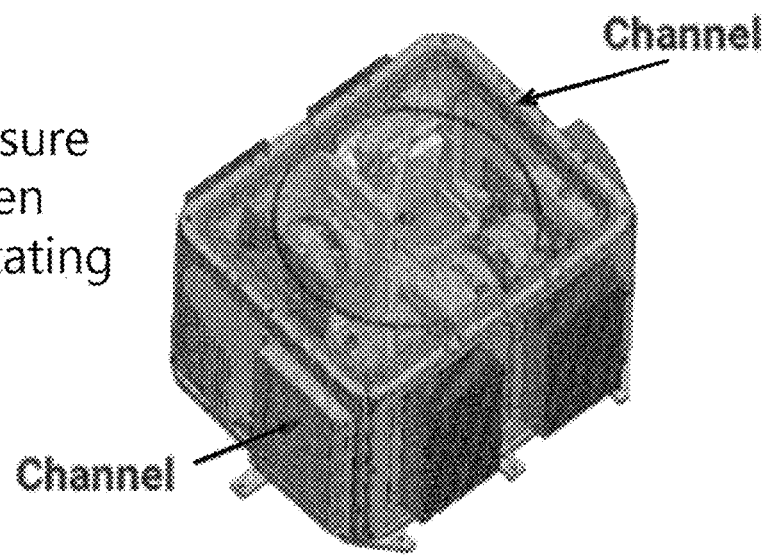
FIG. 11 is a top perspective view of the sensor head of FIG. 1, provided without interior rim parts.

In addition, FIG. 11 is a top perspective view of the sensor head of FIG. 1, provided without interior rim parts, showing channels (e.g., windows 3) of the optical sensors 5, 6. The sensor head 1 can be sealed when attached to the rotating platform 10, and be waterproof and protected from dust to a certain degree. For example, the sensor head 1 can have an IP67 protection code.

Figure 12:
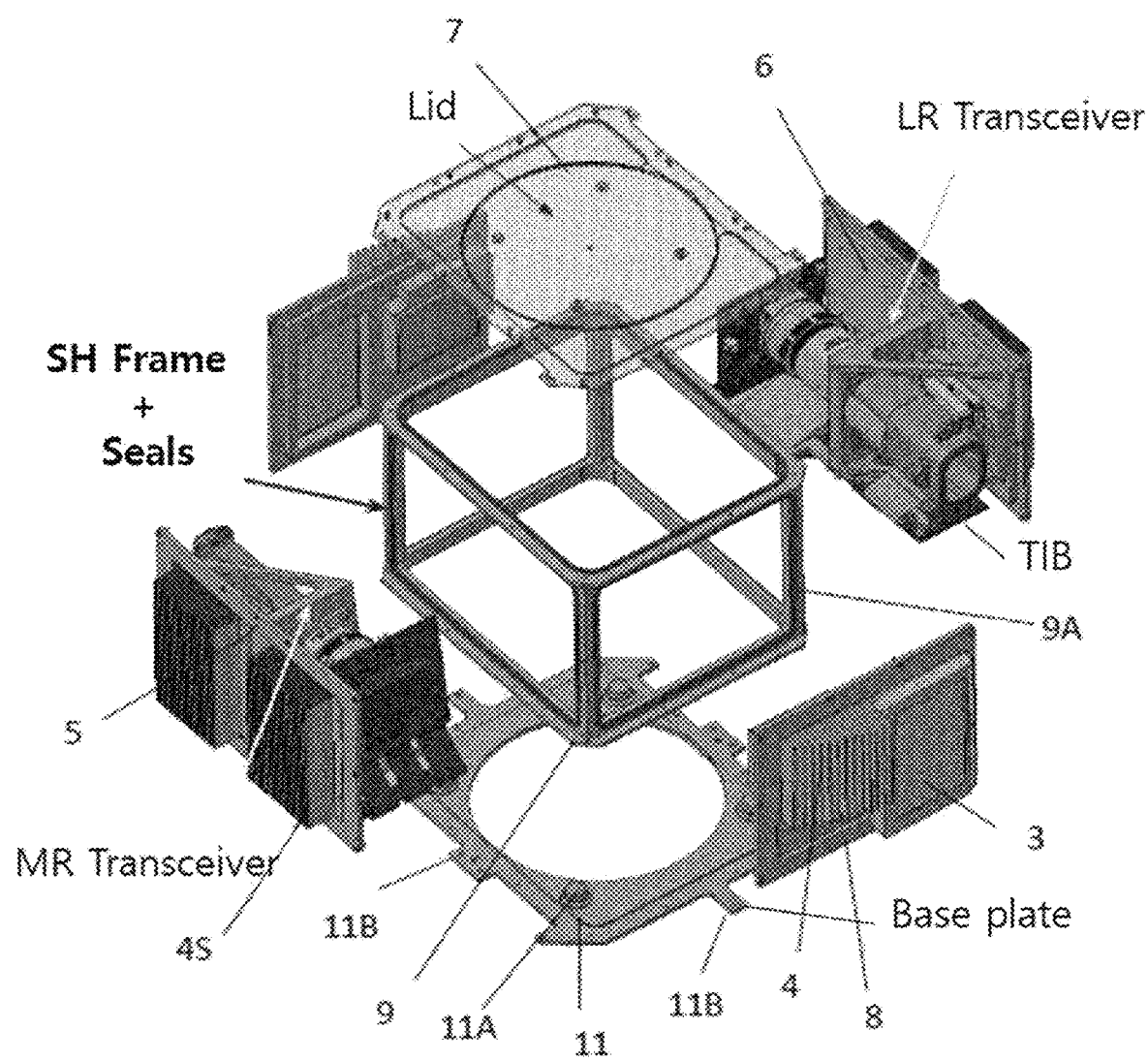
FIG. 12 is an exploded view of the of the sensor head according to an embodiment of the present disclosure.
Figure 13:
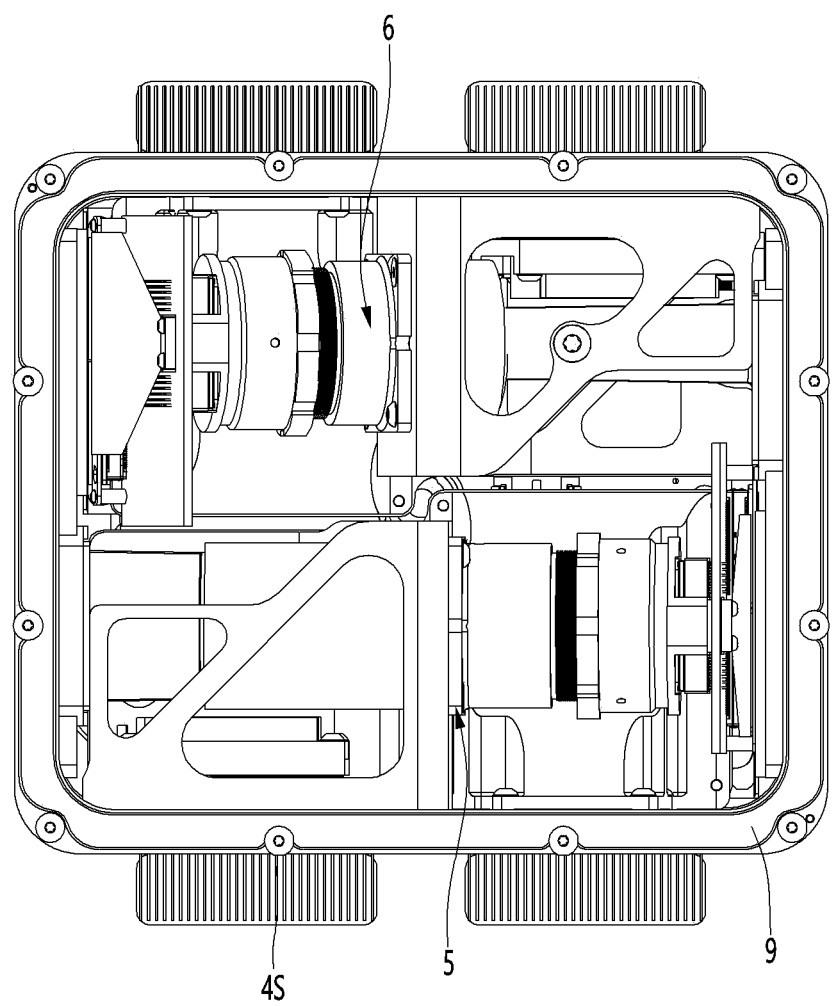
FIG. 13 is a cross-sectional view of the sensor head of FIG. 12.

Next, FIG. 12 is an exploded view of the of the sensor head according to an embodiment of the present disclosure, and FIG. 13 is a cross-sectional view of the sensor head of FIG. 12. FIGS. 12 and 13 are provided with a differently shaped base plate 11 having various protrusions/flanges 11B. The frame 9 can be provided with seals 9A, such as rubber seals, polyurethane seals, or the like, at each mating surface (e.g., each surface facing outwards). Further, each optical sensor 5, 6 can be provided with a plurality of heat sinks 4S disposed at a side surface thereof.

Figure 14:
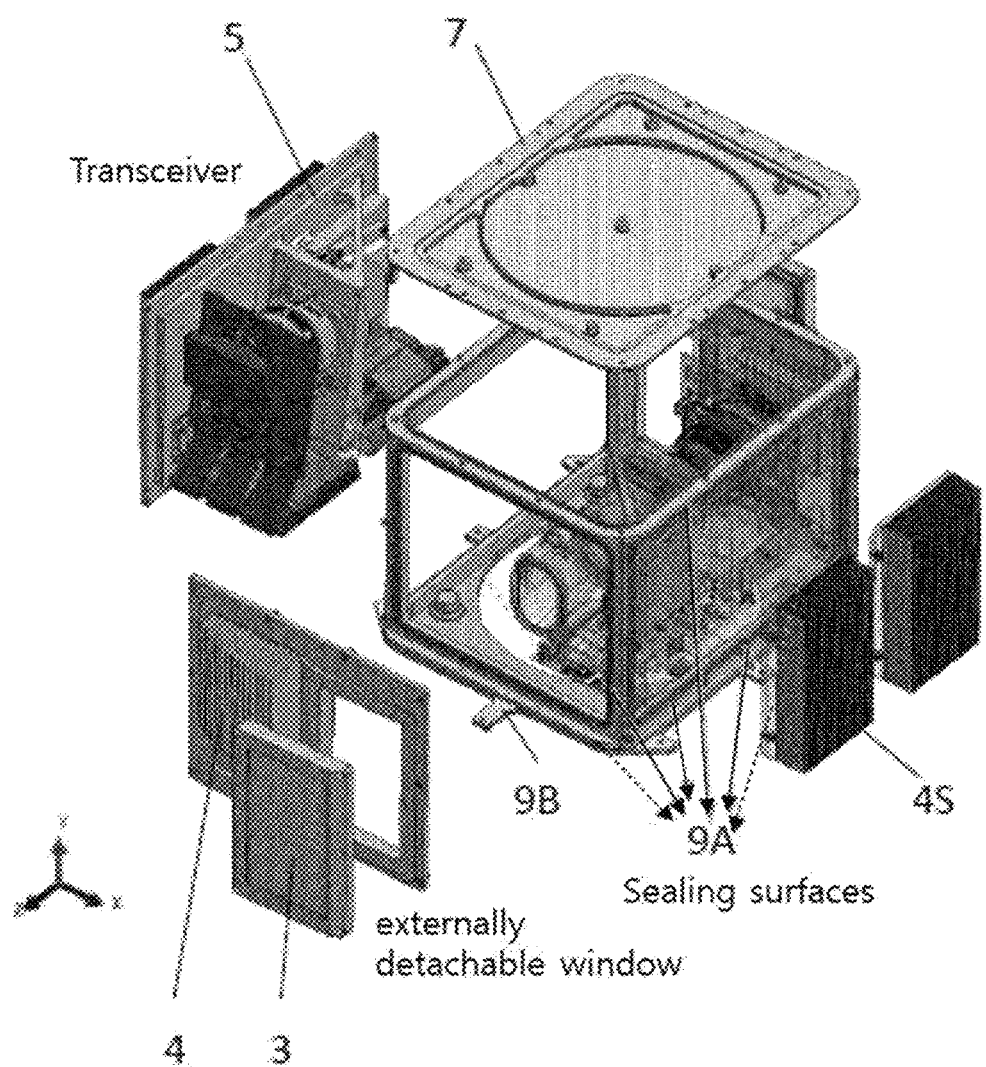
FIG. 14 is an exploded view of a sensor head according to an embodiment of the present disclosure.
Figure 15:
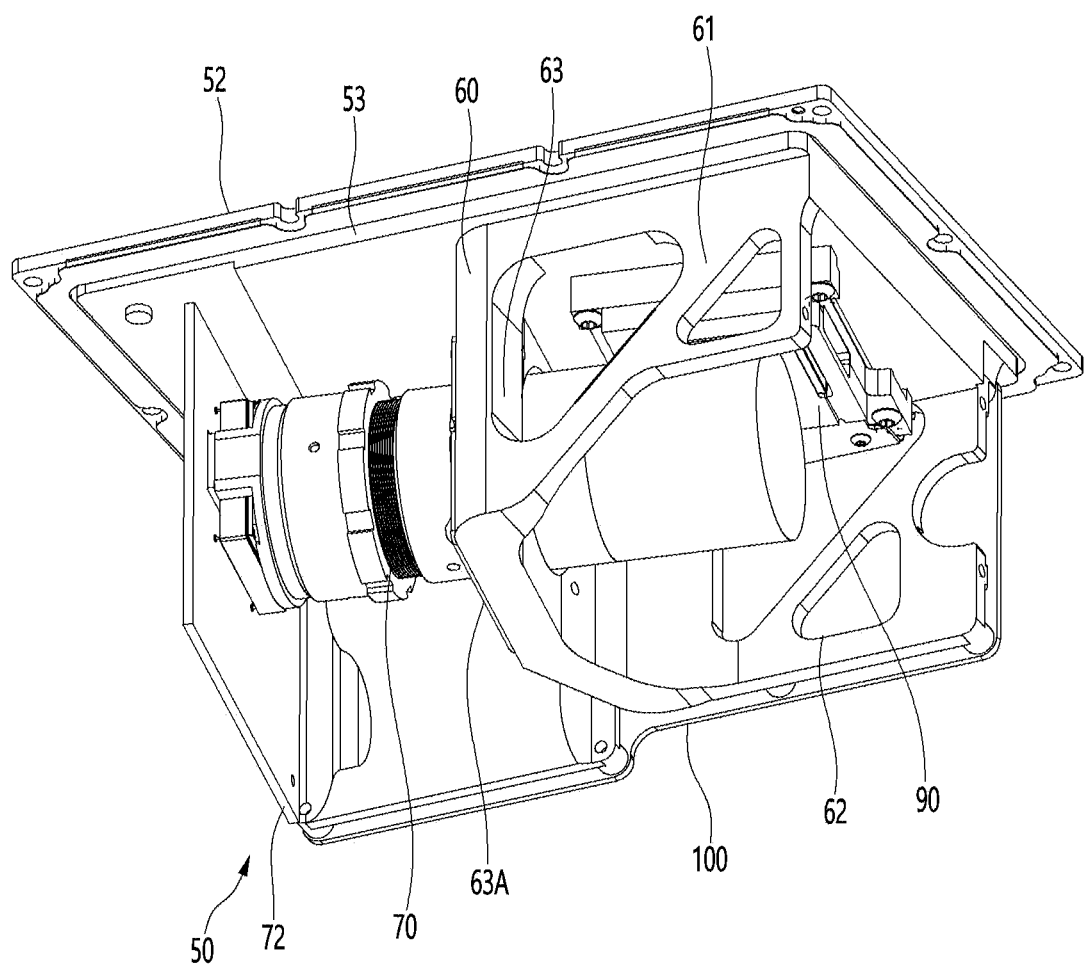
FIG. 15 is a perspective view of a FPGA mounting apparatus according to an embodiment of the present disclosure.
Figure 16:
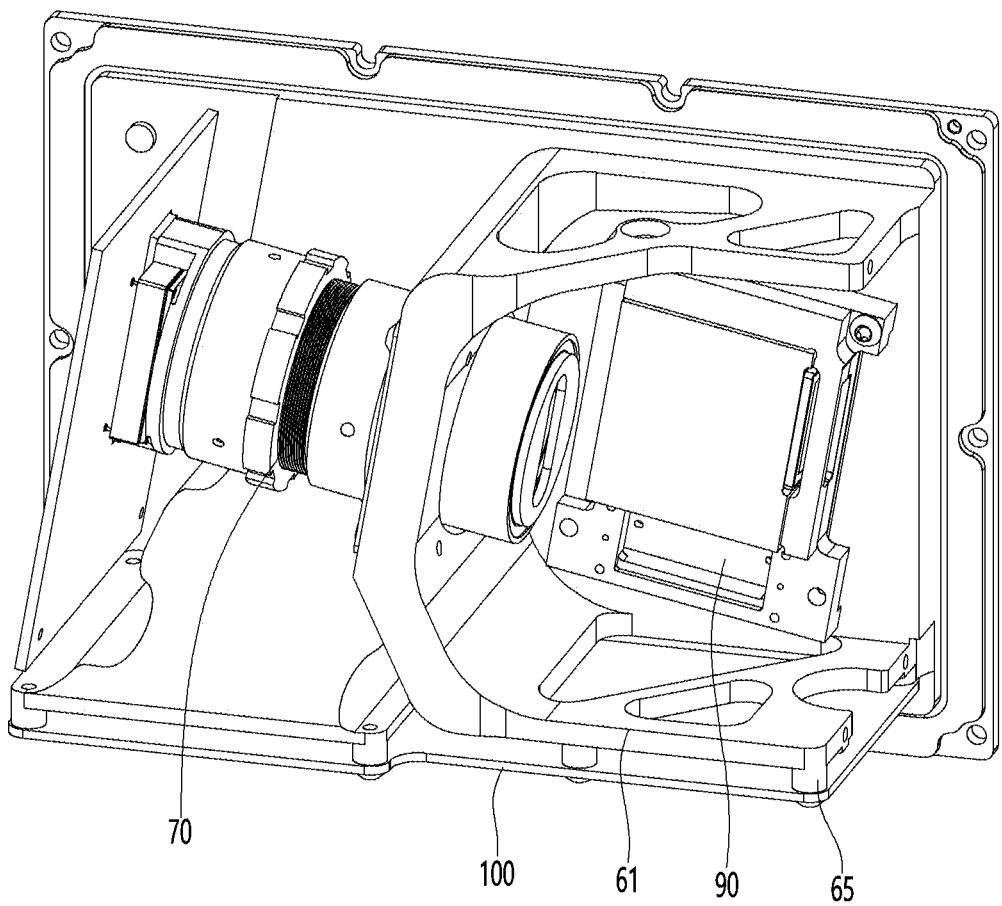
FIG. 16 is a side perspective view of a FPGA mounting apparatus of FIG. 14.

FIG. 14 is an exploded view of the of a sensor head according to an embodiment of the present disclosure, illustrating a plurality of sealing surfaces 9A, and the frame 9 having a plurality of protrusions 9B, with fastening holes for attaching to a base or to an outer cover. In addition, FIGS. 15 and 16 are side perspective views of a lidar assembly 50 including a FPGA mounting apparatus according to an embodiment of the present disclosure. For example, the FPGA mounting apparatus 60 (i.e., the FPGA mounting apparatus) can secure an FPGA module 70, a laser module 80 (e.g., laser driver), Tx (transmit) optics 90, a transceiver interface board (e.g., circuit board) 100, to a sidewall of lidar assembly 50. The mounting apparatus 60 can be attached to the circuit board 100. Further, the lidar assembly 50 can include a side plate assembly 51, which can include a first side plate 52 and a second side plate 53, which is attached to the mounting apparatus 60.

In addition, the Tx optics 90 refers to an output power of the Lidar transceiver. The mounting apparatus 60 may further include a frame 61 and other features to accommodate a variable alignment of the electronic device. For example, the mounting apparatus 60 can include a module mounting structure 63 having a hole (a through-hole) to accommodate the FPGA module 70, and the module mounting structure 63 can be movable in multiple axes to accommodate movement of the FPGA module 70 (e.g., to allow for proper alignment of the FPGA module 70). The module mounting structure 63 can be mounted to the frame 61 of the mounting apparatus 60 via fasteners 63A extending through holes (e.g., apertures, threaded apertures or holes, etc.) of the module mounting structure 63 and the holes of the module mounting structure 63 can be elongated and larger (i.e., have a larger cross-section) than the fasteners to allow for movement of the module mounting structure 63 relative to the mounting apparatus 60. An Li-shaped structure (or L-shaped structure) is shown as oriented laterally and vertically and is provided to secure an optical electronic subcomponent (e.g., the FPGA module 70 or the like, such as any component of a lidar assembly).

The FPGA module 70 can include a circuit board 72 and Rx optics. Rx optics refer to a receiver assembly of the lidar assembly 50, and the receiver assembly can receive the transmitted signal as well as stray light and other light signals. Further, the Rx optics can include a lens assembly, as shown in FIGS. 15 and 16.

According to more specific aspects, the mounting apparatus 60 can be provided with a skeleton frame to minimize mass yet still provide structural rigidity in desired regions. A skeleton frame refers to a frame having holes (e.g., through-holes) or apertures 62, as shown in FIGS. 15 and 16. The holes 62 can have any dimension (e.g., size and shape), and the mounting apparatus 60 shown in FIGS. 15 and 16 includes multiple holes 62 with multiple dimensions to reduce weight of the mounting apparatus 60. Further, the mounting apparatus 60 can include protrusions 65, which include holes for receiving a fastener, in order to attach the circuit board 100 to the mounting apparatus 60.

According to another aspect of the present disclosure, the FPGA mounting apparatus 60 can include a heat-conductive material, such as any type of metal, to transfer heat to walls that are exposed. Additionally, the mounting apparatus 60 can be connected to cooling fins 4S and the like, which allows for heat transfer from the FPGA module 70 to ambient air, thereby providing additional cooling capacity. According to some aspects, the FPGA mounting apparatus 60 can be made of an iron alloy, and aluminum alloy, a magnesium alloy, or the like to help provide reliable structural alignment at manufacturing.

Additionally, the mounting apparatus 60 can further include a fan to direct forced air across an external portion of a sidewall 52, 53 (e.g., the wall onto which the laser module 80 is attached to, as shown in FIGS. 15 and 16) to divert waste heat generated by electronic components. According to some aspects, the FPGA mounting apparatus 60 can also serve as a stabilizing mount for other electronic circuitry, such as laser driver circuits 80, focal plane array circuitry and the like.

In addition, the disclosed assembly and orientation provides additional benefits for an optical sensor/system such as the disclosed lidar system. The opposite direction orientation of the sensors provides for an assembly/housing structure that can provide enhanced thermal stability/profile. For example, the disclosed structure can accommodate cooling systems, fans, and associated air ducts that can provide better thermal performance. Additionally, the space created by such orientation allows for improved accommodation of wiring harnesses, processing circuitry, and sealing components.

Figure 17:
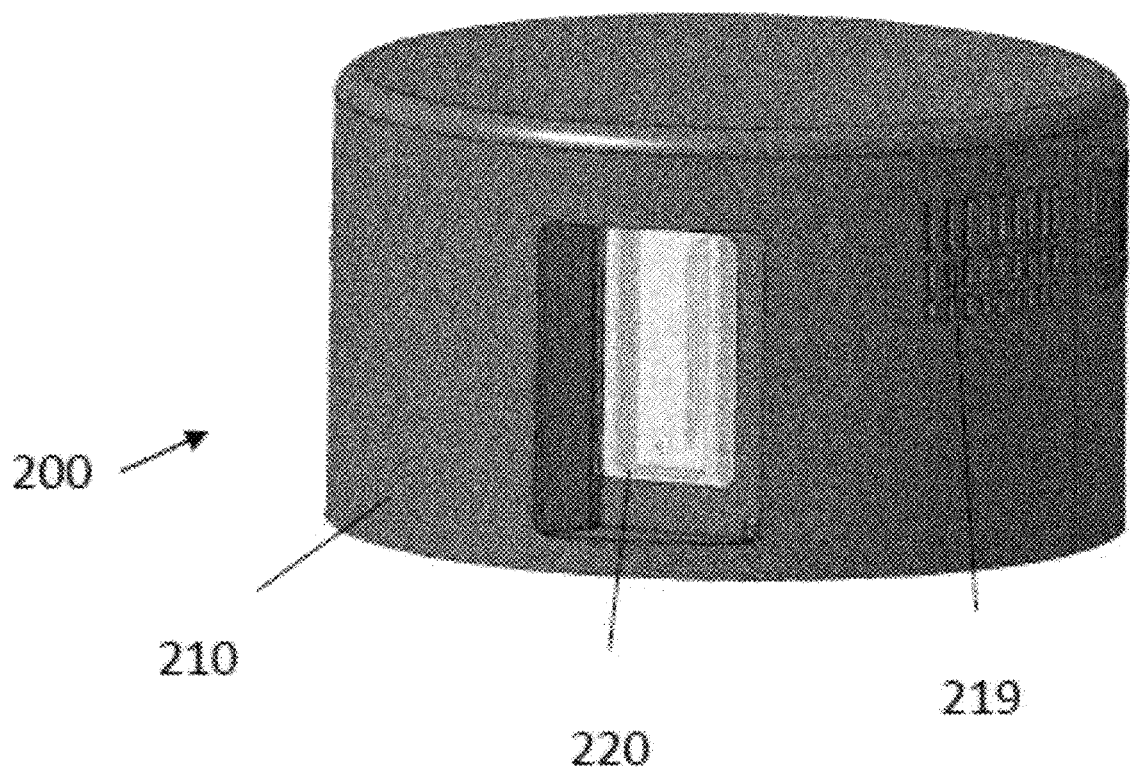
FIG. 17 is a perspective view of an optical sensor enclosure according to an embodiment of the present disclosure.
Figure 18:
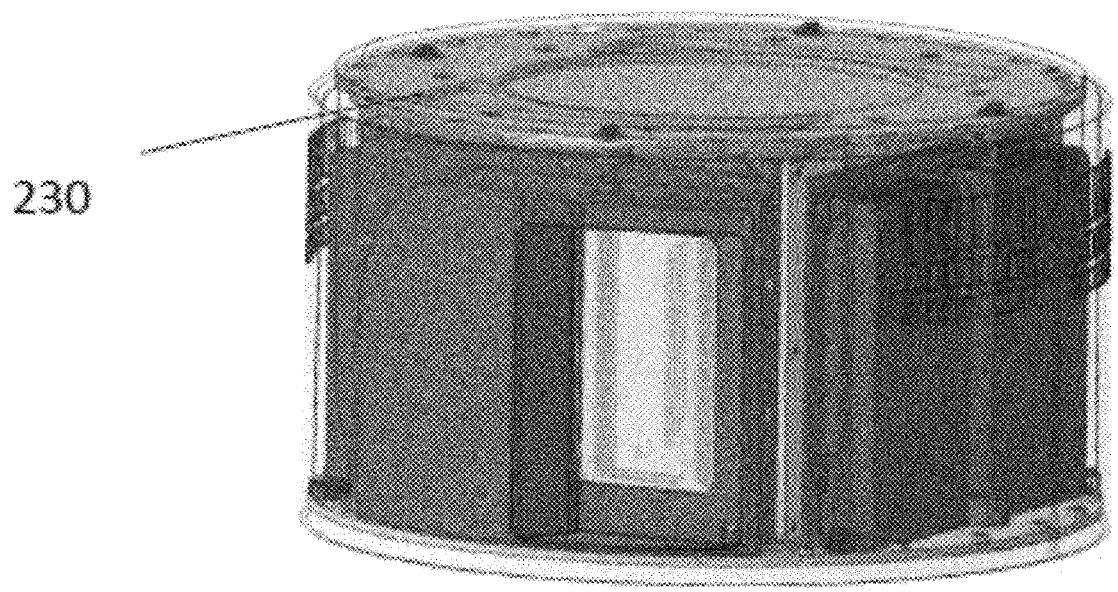
FIG. 18 is a perspective view of an optical sensor enclosure according to an embodiment of the present disclosure.
Figure 19:
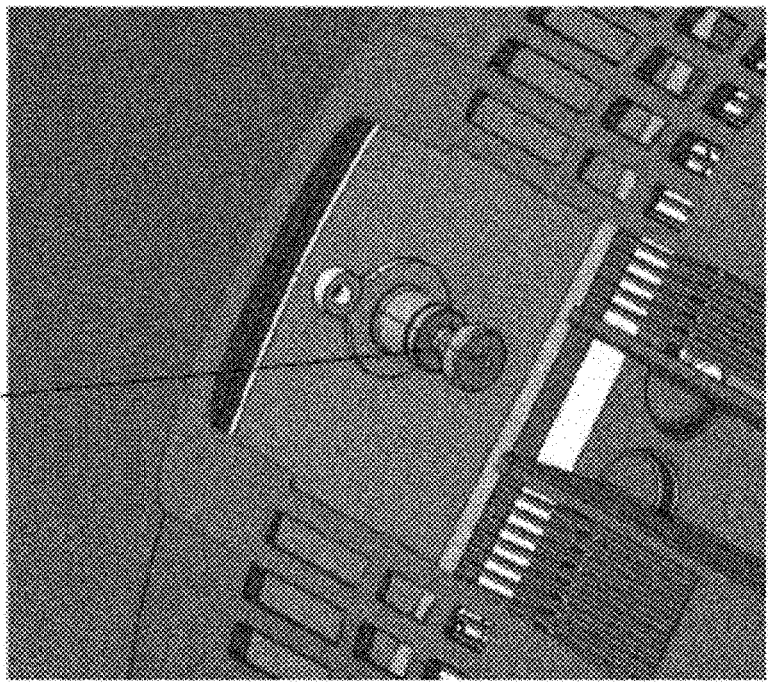
FIG. 19 is a perspective view of an optical sensor enclosure showing fastening location(s).
Figure 20:
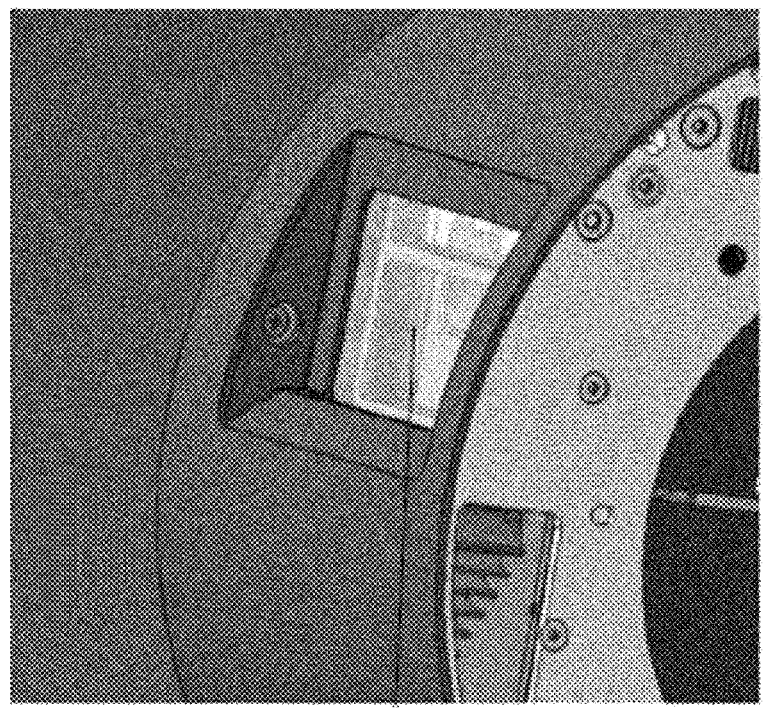
FIG. 20 is a perspective view of an optical sensor enclosure showing fastening locations.
Figure 21:
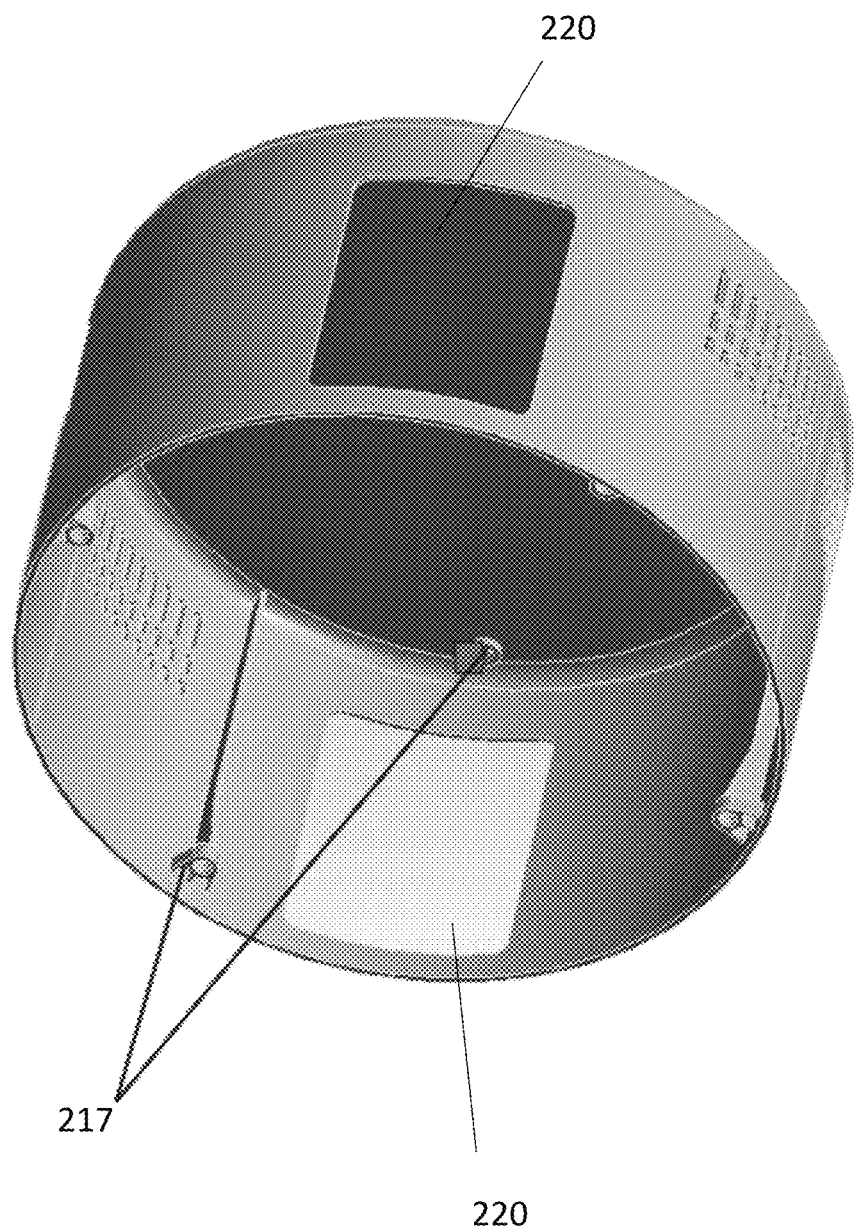
FIG. 21 is a bottom perspective view of an optical sensor enclosure without the optical sensor.

FIG. 17 is a perspective view of an optical sensor enclosure 200 according to an embodiment of the present disclosure, FIG. 18 is a perspective view of an optical sensor enclosure according to an embodiment of the present disclosure, FIG. 19 is a perspective view of an optical sensor enclosure showing fastening location(s), FIG. 20 is a perspective view of an optical sensor enclosure showing other fastening location(s), and FIG. 21 is a bottom perspective view of an optical sensor enclosure without the optical sensor.

The optical sensor enclosure 200 includes an outer cover 210 which has one or more holes for accommodating one or more sensor windows 220. Further, the optical sensor enclosure 200 includes a top plate 230 that is fastened to the outer cover 210 via a plurality of fasteners 215 at a plurality of fastening locations 217. There can be eight (8) fixed fastening locations 217, as shown in FIG. 21. Further, the outer cover 210 can include one or more perforations 219 (e.g., holes extending through an entire thickness of the out cover to allow air to pass from an interior of the outer cover 210 to an exterior of the outer cover 210). The perforations 219 can have a plurality of different sizes and can be distributed at certain locations of the outer cover 210, including at locations corresponding to a location of optical sensors. FIG. 20 illustrates the sensor window 220 attached to the outer 210 via a fastener. Further, the optical sensor enclosure 200 can accommodate a plurality of optical sensors, such that it is provided with multiple sensor windows 220, as shown in FIG. 21.

Also, the enclosure mounted on a base of the lidar sensor system improves the performance of the lidar system. In one example, the enclosure can be mounted using underside fasteners leading to improved aerodynamic qualities (as opposed to exposed external fasteners) as well as improve the mass balance distribution of the overall lidar sensor system.

According to some examples of the present disclosure, a series of fasteners securing an outer cover can be secured from beneath such that the fastener heads are not in wind flow regions. The fastener heads are also less visible or fully hidden to external viewers, thus improving the aesthetics of the external appearance of the lidar device. More specifically, at least one of the securing fasteners can be disposed within a recess formation associated with the lidar lens to provide a tool access angle (for example, as shown by dashed arrow in the right figure above) to secure the fastener once the housing is placed on the device.

In addition, the optical sensor enclosure can be formed of material improving heat dissipation as well as detectability by other sensors.

The present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims.

What is claimed is:

1. An optical sensor assembly comprising:
   a housing structure;
   a frame having a top, a bottom and sides, the sides formed by posts extending between the top and bottom to form open sides;
   a first optical sensor secured between the posts of a first side of the frame, the first optical sensor being arranged to sense in a first direction; and
   a second optical sensor secured between the posts of a second side of the frame, the second optical sensor being arranged to sense in a second direction, wherein the frame includes a third side and a fourth side respectively disposed between the first side and the second side, wherein a portion of the first optical sensor extends from the fourth side to a region adjacent to the third side, wherein a portion of the second optical sensor extends obliquely from the third side to a region adjacent the fourth side, wherein the portion of the first optical sensor is inclined in a direction perpendicular to the first and second directions more than the portion of the second optical sensor, wherein the frame includes six facia, wherein one or more of the six facia are configured to receive modular cooling elements, wherein one or more of the six facia are configured to receive a modular detachable optical window, and wherein one or more of the six facia are configured to rigidly secure one or more transceiver assemblies of the first and second optical sensors.

2. The optical sensor assembly of claim 1, wherein the optical sensor assembly is a lidar assembly.

3. The optical sensor assembly of claim 1, wherein each edge of the frame is formed by a post to form an open top and an open bottom.

4. An optical sensor assembly comprising:
a housing structure;
a frame having a top, a bottom and sides, the sides formed by posts extending between the top and bottom to form open sides;
a first optical sensor secured between the posts of a first side of the frame, the first optical sensor being arranged to sense in a first direction;
a second optical sensor secured between the posts of a second side of the frame, the second optical sensor being arranged to sense in a second direction,
wherein the frame includes a third side and a fourth side respectively disposed between the first side and the second side,
wherein a portion of the first optical sensor extends from the fourth side to a region adjacent to the third side,
wherein a portion of the second optical sensor extends obliquely from the third side to a region adjacent the fourth side, and
wherein the portion of the first optical sensor is inclined in a direction perpendicular to the first and second directions more than the portion of the second optical sensor; and
a base plate supporting the first and second optical sensors,
wherein a lower perimeter of the frame is coupled to an upper perimeter of the base plate, and
wherein the portion of the first optical sensor and the portion of the second optical sensor do not overlap in a direction from the third side to the fourth side of the frame.

5. The optical sensor assembly of claim 4, further comprising:
a first plate disposed outside the frame in the first direction; and
a second plate disposed outside the frame in the second direction.

6. The optical sensor assembly of claim 5, wherein the frame has a plurality of sealing surfaces for coupling the first plate and the second plate.

7. The optical sensor assembly of claim 5, wherein the frame includes a plurality of protrusions that protrude from a lower outer side of the frame and are coupled to a base or an outer cover.

8. The optical sensor assembly of claim 5, wherein the first plate is disposed on one side of the first optical sensor and includes a light-transmitting first window, and
wherein the second plate is disposed on the other side of the second optical sensor and includes a light-transmitting second window.

9. The optical sensor assembly of claim 8, further comprising:
a first cooling element having a plurality of cooling fins coupled to a first side plate of the first optical sensor; and
a second cooling element having a plurality of cooling fins coupled to a second side plate of the second optical sensor,
wherein each of the first optical sensor and the second optical sensor has an FPGA module, and
wherein a portion of the FPGA module is coupled to a FPGA mounting apparatus of each of the first and second side plates.

10. The optical sensor assembly of claim 8, wherein the first plate is coupled to the third side of the frame and includes a first heat sink,
wherein the second plate is coupled to the fourth side of the frame and includes a second heat sink,
wherein the light-transmitting first window of the first plate corresponds to the portion of the first optical sensor, and
wherein the light-transmitting second window of the second plate corresponds to the portion of the second optical sensor.

11. The optical sensor assembly of claim 8, wherein the first window and the second window are separated from each other, and
wherein the first and second sides are opposite sides of the frame.

12. The optical sensor assembly of claim 8, wherein the second plate includes a second heat sink disposed on one side of the second optical sensor, and
wherein the first plate includes a first heat sink disposed on the other side of the first optical sensor.

13. The optical sensor assembly of claim 8, further comprising:
a first cooling element having a plurality of cooling fins coupled to a first side plate of the first optical sensor,
wherein the first side plate of the first optical sensor is coupled to the first side of the frame.

14. The optical sensor assembly of claim 13, wherein the first cooling element is disposed on an outer region of the first side plate.

15. The optical sensor assembly of claim 8, further comprising:
a second cooling element having a plurality of cooling fins coupled to a second side plate of the second optical sensor,
wherein the second side plate of the second optical sensor is coupled to the second side of the frame, and
wherein the first and second sides are opposite sides of the frame.

16. The optical sensor assembly of claim 15, wherein the second cooling element is disposed on an outer region of the second side plate.

17. The optical sensor assembly of claim 5, wherein the first optical sensor includes a first transmitter and a first receiver fixed to the first plate, and
- wherein the second optical sensor includes a second transmitter and a second receiver fixed to the second plate, and
- wherein the portion of the first optical sensor and the portion of the second optical sensor overlap in a direction from the first side to the second side of the frame.

18. The optical sensor assembly of claim 17, wherein the first optical sensor and the second optical sensor are arranged to transmit and receive light in opposite directions.

19. The optical sensor assembly of claim 18, wherein the first optical sensor and the second optical sensor have different oriented angles.

\* \* \* \* \*